(12) United States Patent
De Castelbajac et al.

(10) Patent No.: US 9,975,253 B2
(45) Date of Patent: May 22, 2018

(54) GRIPPER FINGER, GRIPPER TIP, GRIPPER JAW, AND A ROBOT SYSTEM

(71) Applicant: F&P Robotics AG, Glattbrugg ZH (CH)

(72) Inventors: Charles De Castelbajac, Zürich (CH); Hansruedi Frueh, Aadorf (CH); Norman Wijeyratne, Kloten (CH)

(73) Assignee: F&P ROBOTICS AG, Glattbrugg (CH)

( * ) Notice: Subject to any disclaimer, the term of this patent is extended or adjusted under 35 U.S.C. 154(b) by 0 days. days.

(21) Appl. No.: 15/123,442

(22) PCT Filed: Mar. 17, 2014

(86) PCT No.: PCT/EP2014/055273
§ 371 (c)(1),
(2) Date: Sep. 2, 2016

(87) PCT Pub. No.: WO2015/139716
PCT Pub. Date: Sep. 24, 2015

(65) Prior Publication Data
US 2017/0066142 A1    Mar. 9, 2017

(51) Int. Cl.
*B25J 15/04*    (2006.01)
(52) U.S. Cl.
CPC .......... *B25J 15/0475* (2013.01); *Y10S 901/39* (2013.01)
(58) Field of Classification Search
CPC .............................. B25J 15/0475; Y01S 901/39
USPC ............. 294/218, 106, 103.1, 111, 213, 907; 901/25, 39, 45, 41
See application file for complete search history.

(56) References Cited

U.S. PATENT DOCUMENTS

| 4,613,277 A | 9/1986 | Guay |
| 4,676,541 A * | 6/1987 | Lord ..................... B25J 15/0475 294/119.1 |
| 4,699,414 A * | 10/1987 | Jones ..................... B25J 15/026 294/119.1 |

(Continued)

FOREIGN PATENT DOCUMENTS

| DE | 3513893 A | 10/1986 |
| DE | 102004029051 B3 | 7/2005 |

(Continued)

OTHER PUBLICATIONS

International Search Report and Written Opinion dated Nov. 17, 2014 in International Patent Application No. PCT/EP2014/055273, filed Mar. 17, 2014 (with English Translation).

*Primary Examiner* — Paul T Chin
(74) *Attorney, Agent, or Firm* — Global IP Counselors, LLP

(57) ABSTRACT

A gripper finger for grasping objects includes a gripper jaw and a gripper tip which extends with a gripper axis along a longitudinal direction. The gripper tip is detachably connected to the gripper jaw by a connecting element. The connecting element can be locked with a connecting socket extending in the longitudinal direction in the form of a plug-in connection in such a manner that in the locked state it is impossible for the gripper tip to tilt away in relation to the gripper axis and simultaneously the gripper tip is locked against the gripper jaw in relation to the longitudinal direction by a predefinable longitudinal locking force.

18 Claims, 3 Drawing Sheets

(56) References Cited

U.S. PATENT DOCUMENTS

| | | | | |
|---|---|---|---|---|
| 5,256,128 A | * | 10/1993 | Neumann | B23Q 1/0063 |
| | | | | 294/86.4 |
| 7,494,168 B1 | * | 2/2009 | Miller | B01L 9/50 |
| | | | | 294/103.1 |
| 2017/0072571 A1 | * | 3/2017 | De Castelbajac | B25J 15/0475 |

FOREIGN PATENT DOCUMENTS

| | | |
|---|---|---|
| DE | 202011052430 U1 | 5/2013 |
| EP | 1785238 A2 | 5/2007 |
| JP | 2005131718 A | 5/2005 |
| WO | 2008009828 A2 | 1/2008 |

* cited by examiner

GRIPPER FINGER, GRIPPER TIP, GRIPPER JAW, AND A ROBOT SYSTEM

CROSS-REFERENCE TO RELATED APPLICATIONS

This application is a U.S. National Stage application of International Application No. PCT/EP2014/055273, filed Mar. 17, 2014, the contents of each of which is hereby incorporated herein by reference.

BACKGROUND

Field of Invention

The invention relates to a gripper finger, a gripper tip and a gripper jaw as well as a robot system equipped therewith.

Background Information

Gripping tools for robot systems have long been known in the prior art in many different variants. The known gripping tools usually comprise two gripper fingers, each with one gripper jaw each of which having one gripper tip. The gripper jaws can, for example, be fastened movably to linear guides and they can be constructed movably towards and away from each other. As a result, also the two gripper jaws attached thereto can be moved exactly towards and away from each other in such a manner that objects can specifically be grasped, moved to another place and put down again. Such gripper systems are known to the man skilled in the art under the term "parallel-grippers". Such systems for grasping workpieces are for example known from EP 0 2231 B1, EP 0 993 916 B1 or EP 2 548 706 A1.

There are robots, so called "buckling arm robots" described for example in WO 02/086637 A1" whose application is much more flexible and which are often used advantageously in particular for mobile robot systems.

SUMMARY

Nowadays gripper fingers are often not only mechanical gripping tools, but highly complex systems containing electronic components and sensors of different types, such as optical cameras, ultrasonic sensors or other acoustic sensors, such as microphones, or thermal sensors, force sensors etc. By such sensors a correspondent robot system can "feel" its environment with the gripper fingers or detect the properties of its environment which are essential for the function of the robot system.

Thus, such robot system can for example recognize independently whether an object to be grasped is rather a soft object, such as a plastic bottle, or rather a hard object, such as a glass bottle and it can then adjust independently and flexibly a force necessary for the gripper fingers to grasp the object to an optimum value. Depending on the existing sensors the robot system can also recognize the type of object or it can, for example, distinguish whether the object to be grasped is a dead object or a living object. Nowadays such robot systems can recognize and also analyse a plurality of other properties. In particular, even intelligent robot systems are known which can learn independently from the environmental data recorded by sensors and, as a consequence, they can, for example, adapt to the requirements of initially unknown environments or initially unknown objects to be grasped.

This is of particular importance if such a robot system is used for carrying out delicate assemblies with very different components or if, for example, a human being should be supported in various everyday activities. In particular in the case when such a robot system interacts directly with a human being, a highly sensitive sensor technology is, of course, of the utmost importance for the simple reason of security.

Particular importance is attached to the gripper tip of a gripper finger because on the one hand for grasping an object to be moved the gripper tip must be brought in touching contact with this object and on the other hand the gripper tip often contains the sensors necessary for recognizing the environment and recognizing the properties of the objects to be grasped. For this reason in many applications the gripper tip must in each case be individually adjusted to the tasks to be performed specifically and the properties of the working environment, respectively, and thus finally to the particular properties of the objects to be grasped and to be moved.

In order to use one and the same robot system for a plurality of different tasks, it is a known method to design exchangeable gripper tips. For example, a set of different gripper tips can be provided which can differ, for example, in their gripping geometry, material, surface finish, sensor technology and so on, each being optimally adapted to certain tasks to be performed. Thus, very different tasks can be carried out by one and the same robot system only by replacing the gripper tips of the gripper finger.

Especially in applications where the robot systems must perform highly complex or very different tasks and therefore the gripper tips must often be replaced, it is, of course, desirable that the exchange of the gripper tip can be done as simply as possible and preferably mechanically. This is one of the essential problems of known systems, since in complex procedures the gripper tips must often be removed, for example unscrewed, from the gripper jaw. Up to now, when changing the gripper tip, it has been complex to separate and to reinstall additional possibly existing electrical connecting lines for the sensor technology between the gripper jaw and the gripper tip or hydraulic or pneumatic connections for possibly existing driving units for the drive of moveable parts of the gripper jaw or the gripper tip.

SUMMARY

Therefore it is an object of the invention to provide a gripper finger including of a gripper jaw and a gripper tip, a gripper jaw and a gripper tip for a gripper finger as well as a corresponding robot system where the disadvantages known from the prior art are reliably remedied in such a manner that the gripper tip can be replaced in a particularly simple, efficient and preferably mechanical way, possibly by the corresponding robot system itself.

The subject matter of the invention which solves these problems are characterized by the features described herein.

As a consequence, the invention relates to a gripper finger of a gripping tool for a robot system. For grasping objects the gripper finger comprises a gripper jaw and a gripper tip which extends with a gripper axis along a longitudinal direction, wherein the gripper tip can be connected detachably to the gripper jaw by a connecting element. According to the invention the connecting element can be locked with a connecting socket extending in the longitudinal direction in the form of a plug-in connection in such a manner that in the locked state it is impossible for the gripper tip to tilt away in relation to the gripper axis and simultaneously the gripper tip is locked against the gripper jaw in relation to the longitudinal direction by a predefinable longitudinal locking force.

It is essential for the invention that the connection between gripper tip and gripper jaw is realized by a longitudinal plug-in connection comprising two plug elements, namely the connecting socket and the connecting element, in such a manner that the connection between gripper jaw and gripper tip is established or detached by simply moving the gripper tip and the gripper jaw in the longitudinal direction, i.e. in a direction to which the gripper jaw and the gripper tip, respectively, extends essentially, towards each other or, to separate them, away from each other without any further movement in another space direction being necessary.

This means that the first essential advantage of the gripper finger according to the invention is that it is possible to separate the gripper tip from the gripper jaw by a simple linear movement. This constitutes particularly an important advantage when the gripper tip has to be changed mechanically since the changing device must carry out only one simple linear movement in space for separating the gripper tip from the gripper jaw or for assembling both components.

At the same time another essential advantage of the gripper finger according to the invention is that the connecting element can be locked with the connecting socket in the form of a plug-in connection in such a manner that in the locked state the gripper finger is locked quasi automatically with the gripper jaw in the longitudinal direction by a predefinable longitudinal locking force, simply by the connection between the connecting element and the connecting socket with a predefinable locking force which is sufficient for the application.

The fact that on the one hand in the locked state the plug-in connection of the invention prevents the gripper tip from tilting away in relation to the gripper axis and simultaneously the gripper tip can be locked against the gripper jaw in relation to the longitudinal direction by a desired adjustable locking force, the gripper tip according to the invention can be reliably established and detached with one single linear movement in the longitudinal direction by applying the locking force, without any further complex movement or manipulation in space being necessary and without the need of providing any further tool, since neither any screw connection, further plug-in connection nor any other connection of any kind whatsoever has to be established complicatedly or detached in a complex manner.

It is self-explanatory that, of course, not only one single plug-in connection according to the present invention can be provided in one and the same gripper finger, but preferably several plug-in connections simultaneously which on the one hand can increase the stability of the plug-in connection with respect to tensile stress in the longitudinal direction and/or with respect to a tilting movement in relation to the longitudinal direction. On the other hand they can fulfil further functions, such as the insertion of a connecting line described in detail below.

This advantage of the plug-in connection according to the invention is particularly most effective if necessary electrical, pneumatic, hydraulic or other connecting lines between the gripper jaw and the gripper tip are integrated in the plug-in connection according to the invention, since these can also be automatically connected or separated in the same simple way, i.e. without any additional effort by the described simple linear movement, when the gripper tip and the gripper jaw are separated or connected.

In a special embodiment the connecting socket is provided in the gripper jaw and the connecting element in the form of a connecting pin is connected non-detachably to the gripper tip in such a manner that the connecting pin can be locked with the connecting socket by the longitudinal locking force. In this respect it is self-explanatory that in a further embodiment the connecting socket can also be provided in the gripper tip, wherein, in this case, the connecting element in the form of a connecting pin is connected non-detachably to the gripper jaw in such a manner that the connecting pin can be locked with the connecting socket by the longitudinal locking force.

Even more preferably the connecting element comprises a first locking element and the connecting socket comprises a second locking element which is geometrically complementary to the first locking element, wherein for the generation of the longitudinal locking force the first locking element and/or the second locking element are equipped with an elastic force element.

The elastic force element can be, for example, a spring which applies a corresponding force to the connection between the first locking element and the second locking element and the connecting element and the connecting socket, respectively, in such a manner that the gripper tip and the gripper jaw can be locked together by the predefined locking force.

The elastic force element, however, can also be an elastic plastic sleeve or an elastic plastic element, such as a plastic ring, which is arranged at a suitable place between the connecting element and the connecting socket.

The first locking element as such can, for example, be provided in a manner known per se in the form of a rotationally symmetrical or even non-rotationally symmetrical recess at the locking element, for example in the area of the tip of the locking element, whereas the second locking element is designed in the form of a geometrically complementary connecting socket into which the first locking element can be locked by the predefined locking force.

This means that in a more general geometrical embodiment the connecting element and the connecting socket can be formed in a geometrically complementary way in such a manner that the connecting element and the connecting socket can be positively connected together in such a manner that in the locked state the longitudinal locking force is ensured by the positive connection between the connecting element and the connecting socket.

Of course, there are many other suitable ways to generate the locking force. For example, by forming the connecting element and the connecting socket in a geometrically complementary way in such a manner that the connecting element and the connecting socket are connected positively or non-positively, for example force-fitted, and in the locked state the longitudinal locking force is generated by a mechanical force between the connecting element and the connecting socket based for example on the external air pressure, electromagnetic, particularly electrical or magnetic force. In a special embodiment it is, of course, also possible that another mechanical force, such as one of the various elastic forces described above can generate the locking force.

As it has already been mentioned above and it is known from the prior art, one or several sensors of the same type or of different types can be provided in the gripper jaw and/or in the gripper tip for detecting an environmental signal, wherein the sensor is an infrared sensor and/or an ultrasonic sensor and/or a capacitive sensor and/or an electromagnetic sensor, in particular an electrical or magnetic sensor and/or a piezoelectric sensor and/or a camera for recording an optical signal and/or a microphone for recording an acoustic signal and/or another sensor which allows to detect the properties of the environment necessary for the function of the robot system and to feed them as input variables for the control or regulation of the robot system in a corresponding data processing system.

In this respect an electronic evaluation system can already be provided in the gripper jaw and/or in the gripper tip for analysing the environmental signal. This electronic system carries out at least a first evaluation of the signals detected by the sensors and generates information-bearing signals which are then forwarded to a data processing system provided for this purpose using them for the control or regulation or, for example, for the input and application for a learning algorithm, wherein the transmission is even more preferably carried out via corresponding transmission links provided integrally in the connecting socket and/or connecting element.

It is also self-evident that a gripper finger according to the invention can be designed and constructed more complexly, for example the gripper jaw and/or gripper tip can comprise an additional movable gripping element in such a manner that for example more complex gripping movements are possible, wherein, in this case, a driving unit can be advantageously provided in the gripper jaw and/or in the gripper tip for driving the gripper jaw and/or gripper tip and/or for driving the movable gripping elements.

In this respect the driving unit can be realized in any suitable way; it can be for example a mechanical, an electromagnetic, especially an electrical, magnetic, piezoelectric driving unit or a hydraulic or a pneumatic driving unit.

As described above repeatedly, for transmitting the signal or for transferring a mechanical, electrical, pneumatic or hydraulic energy a transmission link in the form of a mechanical, electromagnetic connection, in particular radio connection or electric line or in the form of a hydraulic or pneumatic line, which is preferably integrated directly into the connecting element and/or into the connecting socket can be provided between the gripper jaw and the gripper tip.

The invention relates also to a gripper tip and a gripper jaw for a gripper finger of the present invention as well as a robot system, in particular an industrial robot or service robot or robot for controlling the quality or a robot system for performing a delicate assembly or for supporting human everyday activities with a gripper finger according to the invention, gripper tip or gripper jaw as described in detail in this application.

BRIEF DESCRIPTION OF THE DRAWINGS

Referring now to the attached drawings which form a part of this original disclosure.

DETAILED DESCRIPTION OF THE EMBODIMENTS

Figure 1:
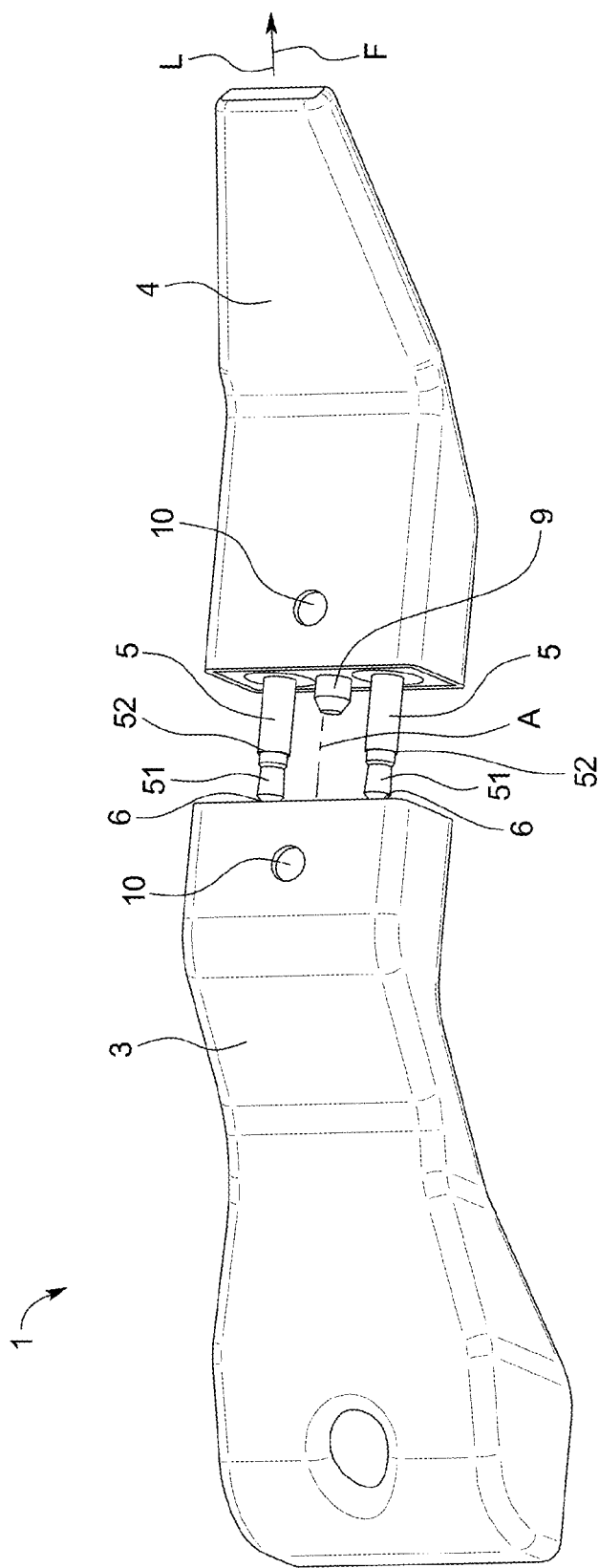
FIG. 1 is in a perspective view an embodiment of a gripper finger according to the invention in the unlocked state.
Figure 2:
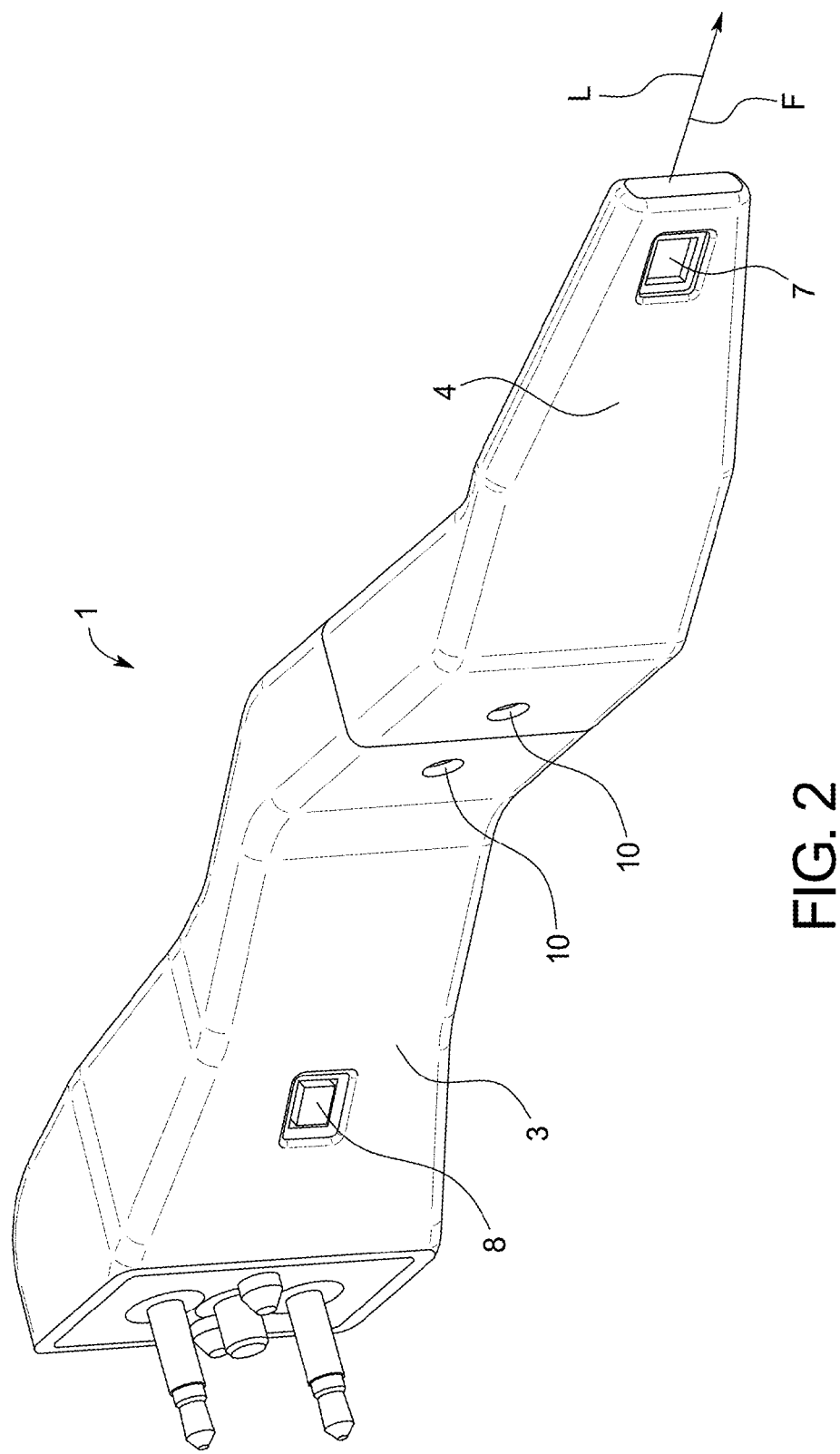
FIG. 2 is the gripper finger of FIG. 1 in another perspective in the assembled locked state.
Figure 3:
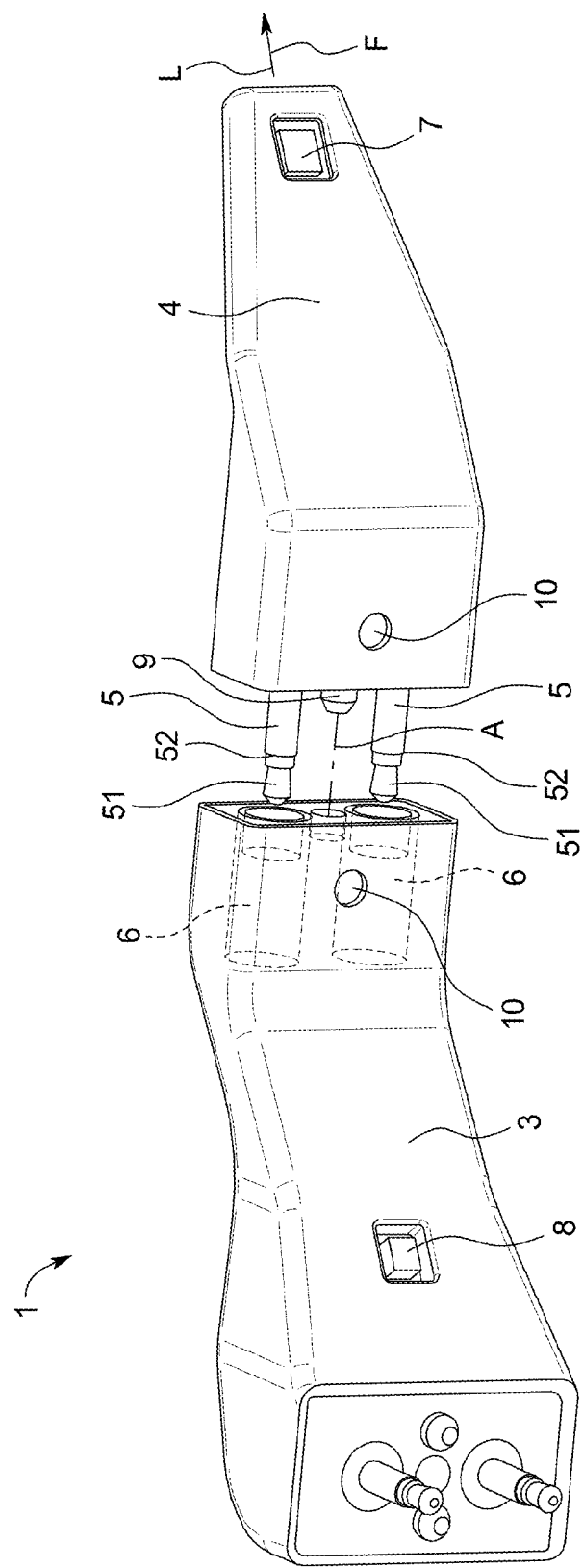
FIG. 3 is the gripper finger of FIG. 1 in the perspective of FIG. 2 in the assembled locked state and in a transparent view.

The FIG. 1, FIG. 2 and FIG. 3 show schematically in a perspective view essential features of an embodiment of a gripper finger according to the invention which is designated in the following as a whole by the reference numeral 1.

FIG. 1 shows the gripper finger 1 in the unlocked and non-assembled state, whereas FIG. 2 shows the gripper finger 1 of FIG. 1 in another perspective in the locked assembled state. Finally FIG. 3 shows essentially the gripper finger 1 of FIG. 1 in the perspective of FIG. 2, i.e. also in the assembled and locked state, but in a transparent view in such a manner that also the inner components of the gripper finger 1 can be recognized. For reasons of clarity the explicit representation of the rest of the robot system has been omitted in all three figures, since the gripper finger 1 according to the invention is basically suitable for all types of robot systems and thus the representation of a special robot system cannot provide additional information for the understanding of the described invention.

For grasping objects the gripper finger 1 according to the invention of a gripping tool for a robot system comprises in a manner known per se a gripper jaw 3 and a gripper tip 4 extending with a gripper axis A along a longitudinal direction L. In this respect the gripper tip 4 can be connected detachably to the gripper jaw 3 by a connecting element 5, in this specific embodiment with two identical connecting elements 5. According to the present invention the connecting element 5 can be locked with a connecting socket 6 which extends in the longitudinal direction L and which is not directly visible in FIG. 1 and FIG. 2 in the form of a plug-in connection in such a manner that in the locked state it is impossible for the gripper tip 4 to tilt away in relation to the gripper axis A and simultaneously the gripper tip 4 is locked against the gripper jaw 3 in relation to the longitudinal direction L by a predefinable longitudinal locking force F.

In this respect, in the present embodiment of FIG. 1 and FIG. 2 the connecting socket 6 is disposed within the gripper jaw 3, as it can be better recognized from FIG. 3 showing the gripper finger 1, as already mentioned, in a similar perspective as FIG. 2 in a transparent schematic view in such a manner that also the components inside the gripper finger 1 are more visible.

Both connecting elements 5 each in the form of a connecting pin are connected non-detachably to the gripper tip 4 in such a manner that the connecting pin can be locked with the connecting socket 6 by the longitudinal locking force F. Attention is also drawn to the fact that in another embodiment, which is not represented here, the connecting socket 6 could also be disposed in the gripper tip 4 and the connecting element 5 in the form of a connecting pin could also be arranged in the gripper jaw 3. Furthermore, it is also possible that two or more connecting elements 5 can be provided, one part of which is arranged at the gripper tip 4 and one part is arranged at the gripper jaw 3, wherein the associated connecting sockets 6 would then correspondingly be distributed on the gripper tip 4 and the gripper jaw 3.

The connecting element 5 comprises a first locking element 51 in the form of a front shaped as a handle and the connecting socket 6 comprises correspondingly a second locking element complementing geometrically the first locking element which is designed in such a manner that for generating the longitudinal locking force F the first locking element 51 can be locked with the second locking element. In the specific embodiment according to FIG. 1 or FIG. 2 and FIG. 3 an elastic force element 52 in the form of a plastic O-ring is provided as additional locking element in such a manner that the desired locking force can be better or optimally adjusted.

In particular FIG. 3 shows a very good view of the sensor 7 arranged in the gripper tip 4 for detecting an environmental signal, wherein the sensor 7 is in this case for example an optic sensor in the form of a miniature camera which allows perception of the environment adequately. Furthermore, an electronic evaluation system 8 equipped with an electronic computer chip which can be replaced from outside, as it can be seen from FIG. 2, is also disposed in the gripper jaw 3. This provides more flexibility to the electronic evaluation system with respect to its function, since depending on the requirement a correspondent computer chip can easily be inserted from outside, for example if another sensor 7 must be evaluated or another evaluation must be carried out.

The connecting elements 5 are simultaneously designed as electric lines for transferring electrical energy between the gripper tip 4 and the gripper jaw 3 and thus they provide the sensor 7 with electrical energy. Additionally, a plug 9 is provided for transmitting sensor signals from the sensor 7 to the electronic evaluation system 8.

The drill holes 10 disposed in the gripper tip 4 and in the gripper jaw 3 are used for receiving the retaining bolts of an automatic changing device which are not shown here for automatically mounting or dismounting the gripper tip 4 at the gripper jaw. The mentioned changing device is object of another invention of the patentee and will be discussed correspondingly in detail in a further patent application.

It is self-evident that the configurations illustrated above and schematically represented in the figures can be used in any combination to form further configurations and to meet special requirements in practice.

The invention claimed is:

1. A gripper finger of a gripping tool for a robot system, the gripper finger comprising:
    a gripper jaw configured to grasp objects;
    a gripper tip extending to define a gripper axis along a longitudinal direction;
    a connecting element configured to detachably connect the gripper tip to the gripper jaw, the connecting element configured to be locked with a connecting socket extending in the longitudinal direction, so as to form a plug-in connection, such that, in the locked state the gripper tip cannot tilt away in relation to the gripper axis and the gripper tip is simultaneously locked against the gripper jaw in relation to the longitudinal direction by a predefined longitudinal locking force; and
    a sensor disposed in the gripper jaw or in the gripper tip, and configured to detect environmental surroundings, the sensor being at least one of an infrared sensor, an ultrasonic sensor, a capacitive sensor, and an electromagnetic sensor.

2. The gripper finger according to claim 1, wherein the connecting socket is disposed in the gripper jaw and the connecting element is a connecting pin non-detachably connected to the gripper tip, such that the connecting pin is capable of being locked with the connecting socket by the longitudinal locking force.

3. The gripper finger according to claim 1, wherein the connecting socket is disposed in the gripper tip and the connecting element is a connecting pin non-detachably connected to the gripper jaw such that the connecting pin is capable of being locked with the connecting socket by the longitudinal locking force.

4. The gripper finger according to claim 1, wherein the connecting element comprises a first locking element and the connecting socket comprises a second locking element geometrically complementary to the first locking element, and at least one of the first locking element and the second locking element includes an elastic force element for the generation of the longitudinal locking force.

5. The gripper finger according to claim 1, wherein the connecting element and the connecting socket are formed in a geometrically complementary way, such that the connecting element and the connecting socket are capable of being positively connected together such that, in the locked state, the longitudinal locking force is ensured by the positive connection between the connecting element and the connecting socket.

6. The gripper finger according to claim 1, wherein the connecting element and the connecting socket are formed in a geometrically complementary way, such that the connecting element and the connecting socket are capable of being positively connected together, and in the locked state the connecting element and the connecting socket are configured to generate an electromagnetic force therebetween to form the longitudinal locking force.

7. The gripper finger according to claim 1, wherein an electronic evaluation system is disposed in at least one of the gripper jaw and the gripper tip, and is configured to analyze environmental surroundings.

8. The gripper finger according to claim 1, wherein at least one of the gripper jaw and the gripper tip comprises a movable gripping element.

9. The gripper finger according to claim 8, wherein a driving unit is disposed in at least one of the gripper jaw and the gripper tip, and is configured to drive at least one of the gripper jaw, the gripper tip, and the movable gripping element.

10. The gripper finger according to claim 9, wherein the driving unit is at least one of a mechanical driving unit, an electromagnetic driving unit, a piezoelectric driving unit, a hydraulic driving unit, and a pneumatic driving unit.

11. The gripper finger according to claim 1, further comprising a transmission link configured to transmit a signal or transfer a mechanical, electrical, pneumatic or hydraulic energy between the gripper jaw and the gripper tip, the transmission link being a mechanical, electromagnetic connection.

12. The gripper finger according to claim 11, wherein the transmission link is integrated into at least one of the connecting element and the connecting socket.

13. The gripper finger according to claim 11, wherein the transmission link is at least one of a radio connection, and electric line, a hydraulic line and a pneumatic line.

14. A robot system, comprising:
    a gripper finger according to claim 1.

15. The robot system of claim 14, wherein the robot system is configured as one of an industrial robot, a service robot, a robot for controlling the quality of or for carrying out an assembly, and a robot for supporting human activities.

16. The gripper finger according to claim 1, wherein the sensor is at least one of an electrical or magnetic sensor, a piezoelectric sensor, a camera configured to record an optical signal, and a microphone configured to record an acoustic signal.

17. A gripper tip for a gripper finger, comprising:
    a sensor configured to detect environmental surroundings, the sensor being at least one of an infrared sensor, an ultrasonic sensor, a capacitive sensor, and an electromagnetic sensor, and
    the gripper tip extending to define a gripper axis along a longitudinal direction, configured to enable a connecting element to detachably connect the gripper tip to a gripper jaw, the connecting element configured to be capable of being locked with a connecting socket extending in the longitudinal direction, so as to form a plug-in connection, such that, in the locked state the gripper tip cannot tilt away in relation to the gripper axis and the gripper tip is simultaneously locked against the gripper jaw in relation to the longitudinal direction by a predefined longitudinal locking force.

18. A gripper jaw for a gripper finger, comprising:
a sensor configured to detect environmental surroundings, the sensor being at least one of an infrared sensor, an ultrasonic sensor, a capacitive sensor, and an electromagnetic sensor, and
the gripper jaw configured to grasp objects and configured to connect to a gripper tip extending to define a gripper axis along a longitudinal direction, the gripper jaw configured to enable a connecting element to detachably connect the gripper tip to a gripper jaw, the connecting element configured to be capable of being locked with a connecting socket extending in the longitudinal direction, so as to form a plug-in connection, such that, in the locked state the gripper tip cannot tilt away in relation to the gripper axis and the gripper tip is simultaneously locked against the gripper jaw in relation to the longitudinal direction by a predefined longitudinal locking force.

* * * * *